United States Patent
Kook et al.

(10) Patent No.: US 9,644,712 B2
(45) Date of Patent: May 9, 2017

(54) PLANETARY GEAR TRAIN OF AUTOMATIC TRANSMISSION FOR VEHICLE

(71) Applicant: Hyundai Motor Company, Seoul (KR)

(72) Inventors: Jae Chang Kook, Whasung-Si (KR);
Wonmin Cho, Whasung-Si (KR);
Myeong Hoon Noh, Whasung-Si (KR);
Seongwook Ji, Whasung-Si (KR);
Kangsoo Seo, Whasung-Si (KR); Seong Wook Hwang, Whasung-Si (KR)

(73) Assignee: Hyundai Motor Company, Seoul (KR)

( * ) Notice: Subject to any disclaimer, the term of this patent is extended or adjusted under 35 U.S.C. 154(b) by 32 days.

(21) Appl. No.: 14/886,539

(22) Filed: Oct. 19, 2015

(65) Prior Publication Data
US 2016/0333969 A1  Nov. 17, 2016

(30) Foreign Application Priority Data
May 13, 2015  (KR) ........................ 10-2015-0066915

(51) Int. Cl.
*F16H 3/66*  (2006.01)

(52) U.S. Cl.
CPC ....... *F16H 3/66* (2013.01); *F16H 2200/0069* (2013.01); *F16H 2200/2012* (2013.01); *F16H 2200/2046* (2013.01)

(58) Field of Classification Search
CPC .................. F16H 2200/0069; F16H 2200/2012
See application file for complete search history.

(56) References Cited

U.S. PATENT DOCUMENTS

| | | | |
|---|---|---|---|
| 2016/0160964 A1* | 6/2016 | Sugiura | F16H 61/0265 475/204 |
| 2016/0341289 A1* | 11/2016 | Kato | F16H 3/666 |
| 2016/0356362 A1* | 12/2016 | Ji | F16H 3/66 |

FOREIGN PATENT DOCUMENTS

| | | |
|---|---|---|
| JP | 2014-500461 A | 1/2014 |
| JP | 2014-35059 A | 2/2014 |
| JP | 10-1448789 B1 | 10/2014 |
| KR | 10-2013-0077146 A | 7/2013 |

\* cited by examiner

*Primary Examiner* — Derek D Knight
(74) *Attorney, Agent, or Firm* — Morgan, Lewis & Bockius LLP

(57) ABSTRACT

A planetary gear train of an automatic transmission for a vehicle may include an input shaft receiving torque of an engine, an output shaft outputting changed torque of the engine, a first planetary gear set, a second planetary gear set, a third planetary gear set, a fourth planetary gear set, a first rotation shaft directly connected to the input shaft, a second rotation shaft selectively connected to a transmission housing, a third rotation shaft, a fourth rotation shaft, a fifth rotation shaft directly connected to the transmission housing, a sixth rotation shaft, a seventh rotation shaft selectively connected to the fourth rotation shaft, and selectively connected to the transmission housing, an eighth rotation shaft selectively connected to the third rotation shaft, and directly connected to the output shaft, and a ninth rotation shaft selectively connected to the second rotation shaft.

9 Claims, 2 Drawing Sheets

FIG. 2

|      | C1 | C2 | C3 | C4 | B1 | B2 |
|------|----|----|----|----|----|----|
| 1ST  |    | O  | O  |    |    | O  |
| 2ND  | O  | O  |    |    |    | O  |
| 3RD  |    | O  |    | O  |    | O  |
| 4TH  | O  |    |    | O  |    | O  |
| 5TH  | O  | O  |    | O  |    |    |
| 6TH  |    |    | O  | O  | O  |    |
| 7TH  |    |    | O  | O  |    | O  |
| 8TH  |    | O  | O  | O  |    |    |
| 9TH  |    |    |    | O  | O  | O  |
| 10TH | O  |    | O  | O  |    |    |
| REV  | O  | O  | O  |    |    |    |

PLANETARY GEAR TRAIN OF AUTOMATIC TRANSMISSION FOR VEHICLE

CROSS-REFERENCE TO RELATED APPLICATION

The present application claims priority to Korean Patent Application No. 10-2015-0066915 filed May 13, 2015, the entire contents of which is incorporated herein for all purposes by this reference.

BACKGROUND OF THE INVENTION

Field of the Invention

The present invention relates to an automatic transmission for a vehicle. More particularly, the present invention relates to a planetary gear train of an automatic transmission of a vehicle that can improve power delivery performance and reduce fuel consumption by achieving the forward speed stages using a minimum number of constituent elements.

Description of Related Art

In recent years, a rise in oil price causes dashing into unlimited competition for enhancing fuel efficiency.

As a result, research into reduction of weight and the enhancement of the fuel efficiency downsizing has been conducted in the case of an engine and research for simultaneously securing operability and fuel efficiency competitiveness through multiple speed stages has been conducted in the case of an automatic transmission.

However, in the automatic transmission, as the number of speed stages increases, the number of internal components also increases, and as a result, the automatic transmission may be difficult to mount, the manufacturing cost and weight may be increased, and power transmission efficiency may be deteriorated.

Accordingly, development of a planetary gear train which may bring about maximum efficiency with a small number of components may be important in order to increase a fuel efficiency enhancement effect through the multiple speed stages.

In this aspect, in recent years, 8 and 9-speed automatic transmissions tend to be implemented and the research and development of a planetary gear train capable of implementing more speed stages has also been actively conducted.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a planetary gear train of an automatic transmission for a vehicle having advantages of improving power delivery performance and fuel efficiency by achieving ten forward speed stages and one reverse speed stage using a driving point positioned at a low engine speed.

According to various aspects of the present invention, a planetary gear train of an automatic transmission for a vehicle may include an input shaft receiving torque of an engine, an output shaft outputting changed torque of the engine, a first planetary gear set including a first sun gear, a first planet carrier, and a first ring gear, a second planetary gear set including a second sun gear, a second planet carrier, and a second ring gear, a third planetary gear set including a third sun gear, a third planet carrier, and a third ring gear, a fourth planetary gear set including a fourth sun gear, a fourth planet carrier, and a fourth ring gear, a first rotation shaft including the first sun gear and the third planet carrier and directly connected to the input shaft, a second rotation shaft including the first planet carrier and the third ring gear and selectively connected to a transmission housing, a third rotation shaft including the first ring gear and the second planet carrier, a fourth rotation shaft including the fourth sun gear, a fifth rotation shaft including the second ring gear and directly connected to the transmission housing, a sixth rotation shaft including the third sun gear, a seventh rotation shaft including the fourth sun gear, selectively connected to the fourth rotation shaft, and selectively connected to the transmission housing, an eighth rotation shaft including the fourth planet carrier, selectively connected to the third rotation shaft, and directly connected to the output shaft, and a ninth rotation shaft including the fourth ring gear and selectively connected to the second rotation shaft.

Each of the first, second, third, and fourth planetary gear sets may be a single pinion planetary gear set.

The first, second, third, and fourth planetary gear sets may be disposed sequentially from an engine side.

The planetary gear train may further include a first clutch disposed between the third rotation shaft and the eighth rotation shaft, a second clutch disposed between the second rotation shaft and the ninth rotation shaft, a third clutch disposed between the fourth rotation shaft and the seventh rotation shaft, a fourth clutch disposed between the sixth rotation shaft and the ninth rotation shaft, a first brake disposed between the second rotation shaft and the transmission housing, and a second brake disposed between the seventh rotation shaft and the transmission housing.

A first forward speed stage may be achieved by operation of the second and third clutches and the second brake, a second forward speed stage may be achieved by operation of the first and second clutches and the second brake, a third forward speed stage may be achieved by operation of the second and fourth clutches and the second brake, a fourth forward speed stage may be achieved by operation of the first and fourth clutches and the second brake, a fifth forward speed stage may be achieved by operation of the first, second and fourth clutches, a sixth forward speed stage may be achieved by operation of the third, fourth clutches and the first brake, a seventh forward speed stage may be achieved by operation of the third and fourth clutches and the second brake, an eighth forward speed stage may be achieved by operation of the second, third and fourth clutches, a ninth forward speed stage may be achieved by operation of the fourth clutch and the first and second brakes, a tenth forward speed stage may be achieved by operation of the first, third and fourth clutches, and a reverse speed stage may be achieved by operation of the first, second and third clutches.

According to various aspects of the present invention, a planetary gear train of an automatic transmission for a vehicle may include an input shaft receiving torque of an engine, an output shaft outputting changed torque of the engine, a first planetary gear set including a first sun gear, a first planet carrier, and first ring gear, a second planetary gear set including a second sun gear, a second planet carrier, and a second ring gear, a third planetary gear set including a third sun gear, a third planet carrier, and a third ring gear, a fourth planetary gear set including a fourth sun gear, a fourth planet carrier, and a fourth ring gear, a first clutch selectively connecting the second planet carrier to the fourth planet carrier, a second clutch selectively connecting the third ring gear to the fourth ring gear, a third clutch selectively connecting the second sun gear to the fourth sun gear, a fourth clutch selectively connecting the third sun gear to the fourth ring gear, a first brake selectively connecting the first planet carrier to the transmission housing, and a second brake selectively connecting the fourth sun gear to the transmission housing, in which the input shaft may be directly connected to the first sun gear, the output shaft may be directly connected to the fourth planet carrier, the first sun gear may be directly connected to third planet carrier, the first planet carrier may be directly connected to the third ring gear, the first ring gear may be directly connected to the second planet carrier, and the second ring gear may be directly connected to the transmission housing.

Various embodiments of the present invention may achieve ten forward speed stages by combining four planetary gear sets with six friction elements. Therefore, power delivery performance and fuel efficiency may be improved.

Since a speed stage suitable to engine speed can be achieved due to multiple speed stages, silent driving may be improved.

It is understood that the term "vehicle" or "vehicular" or other similar terms as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuel derived from resources other than petroleum). As referred to herein, a hybrid vehicle is a vehicle that has two or more sources of power, for example, both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 2 is an operation chart of friction elements at each speed stage in the exemplary planetary gear train according to the present invention.

Figure 1:
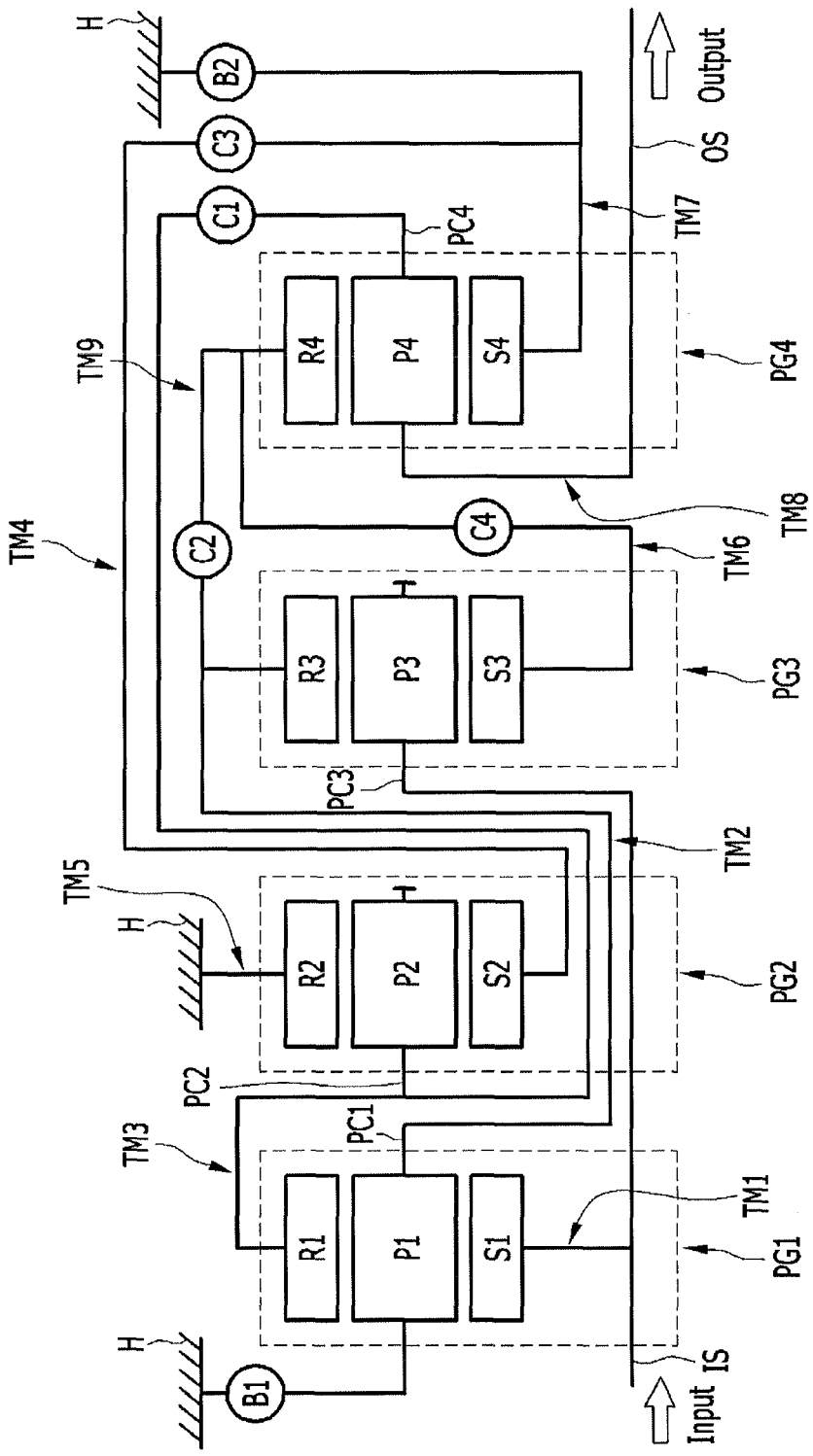
FIG. 1 is a schematic diagram of an exemplary planetary gear train according to the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

FIG. 1 is a schematic diagram of a planetary gear train according to various embodiments of the present invention.

Referring to FIG. 1, a planetary gear train according to various embodiments of the present invention includes first, second, third, and fourth planetary gear sets PG1, PG2, PG3, and PG4 disposed on the same axis, an input shaft IS, an output shaft OS, nine rotation shafts TM1 to TM9 including at least one of rotation elements of the first, second, third, and fourth planetary gear sets PG1, PG2, PG3, and PG4, six friction elements C1 to C4 and B1 to B2, and a transmission housing H.

As a result, torque input from the input shaft IS is changed by cooperation of the first, second, third, and fourth planetary gear sets PG1, PG2, PG3, and PG4, and the changed torque is output through the output shaft OS.

The planetary gear sets PG1, PG2, PG3, and PG4 are disposed sequentially from an engine side.

The input shaft IS is an input member and power from a crankshaft of an engine is torque-converted through a torque converter to be input into the input shaft IS.

The output shaft OS is an output member, and transmits driving torque to a driving wheel through a differential apparatus.

The first planetary gear set PG1 is a single pinion planetary gear set and includes a first sun gear S1, a first planet carrier PC1 rotatably supporting a first pinion P1 that is externally meshed with the first sun gear S1, and a first ring gear R1 that is internally meshed with the first pinion P1 as rotation elements thereof.

The second planetary gear set PG2 is a single pinion planetary gear set and includes a second sun gear S2, a second planet carrier PC2 rotatably supporting a second pinion P2 that is externally meshed with the second sun gear S2, and a second ring gear R2 that is internally meshed with the second pinion P2 as rotation elements thereof.

The third planetary gear set PG3 is a single pinion planetary gear set and includes a third sun gear S3, a third planet carrier PC3 rotatably supporting a third pinion P3 that is externally meshed with the third sun gear S3, and a third ring gear R3 that is internally meshed with the third pinion P3 as rotation elements thereof.

The fourth planetary gear set PG4 is a single pinion planetary gear set and includes a fourth sun gear S4, a fourth planet carrier PC4 rotatably supporting a fourth pinion P4 that is externally meshed with the fourth sun gear S4, and a fourth ring gear R4 that is internally meshed with the fourth pinion P4 as rotation elements thereof.

In the first, second, third, and fourth planetary gear sets PG1, PG2, PG3, and PG4, one or more rotation elements are connected to each other to operate with nine rotation shafts TM1 to TM9.

The nine rotation shafts TM1 to TM9 will be described in further detail.

The first rotation shaft TM1 includes the first sun gear S1 and the third planet carrier PC3, and is directly connected to the input IS so as to be always operated as an input element.

The second rotation shaft TM2 includes the first planet carrier PC1 and the third ring gear R3, and is selectively connected to the transmission housing H.

The third rotation shaft TM3 includes the first ring gear R1 and the second planet carrier PC2.

The fourth rotation shaft TM4 includes the second sun gear S2.

The fifth rotation shaft TM5 includes the second ring gear R1, and is directly connected to the transmission housing H IS so as to be always operated as a fixing element.

The sixth rotation shaft TM6 includes the third sun gear S3.

The seventh rotation shaft TM7 includes the fourth sun gear S4, is selectively connected to the fourth rotation shaft TM4, and selectively connected to the transmission housing H.

The eighth rotation shaft TM8 includes the fourth planet carrier PC4, is selectively connected to the third rotation shaft TM3, and is directly connected to the output shaft OS so as to be always operated as an output element.

The ninth rotation shaft TM9 includes the fourth ring gear R4, and is selectively connected to the second rotation shaft TM2 and the sixth rotation shaft TM6.

In addition, four clutches C1, C2, C3, and C4 which are friction elements are disposed at connection portions between any two rotation shafts.

In addition, two brakes B1 and B2 which are friction elements are disposed at connection portions between any one rotation shaft and the transmission housing H.

The six friction elements C1 to C4 and B1 to B2 will be described in further detail.

The first clutch C1 is interposed between the third rotation shaft TM3 and the eighth rotation shaft TM8 and selectively connects the third input shaft TM3 to the eighth rotation shaft TM8.

The second clutch C2 is interposed between the second rotation shaft TM2 and the ninth rotation shaft TM9 and selectively connects the second rotation shaft TM2 to the ninth rotation shaft TM9.

The third clutch C3 is interposed between the fourth rotation shaft TM4 and the seventh rotation shaft TM7 and selectively connects the fourth rotation shaft TM4 to the seventh rotation shaft TM7.

The fourth clutch C4 is interposed between the sixth rotation shaft TM6 and the ninth rotation shaft TM9 and selectively connects the sixth rotation shaft TM6 to the ninth rotation shaft TM9.

The first brake B1 is interposed between the second rotation shaft TM2 and the transmission housing H and causes the second rotation shaft TM2 to be operated as a selective fixed element.

The second brake B2 is interposed between the seventh rotation shaft TM7 and the transmission housing H and causes the seventh rotation shaft TM7 to be operated as a selective fixed element.

The friction elements including the first, second, third, and fourth clutches C1, C2, C3, and C4 and the first and second brakes B1 and B2 may be multi-plates friction elements of wet type that are operated by hydraulic pressure.

FIG. 2 is an operation chart of friction elements at each speed stage in the planetary gear train according to various embodiments of the present invention.

As shown in FIG. 2, three friction elements are operated at each speed stage in the planetary gear train according to various embodiments of the present invention.

The second and third clutches C2 and C3 and the second brake B2 are operated at a first forward speed stage 1ST.

The first and second clutches C1 and C2 and the second brake B2 are operated at a second forward speed stage 2ND.

The second and fourth clutches C2 and C4 and the second brake B2 are operated at a third forward speed stage 3RD.

The first and fourth clutches C1 and C4 and the second brake B2 operated at a fourth forward speed stage 4TH.

The first, second and fourth clutches C1, C2, and C4 are operated at a fifth forward speed stage 5TH.

The third and fourth clutches C3 and C4 and the first brake B1 are operated at a sixth forward speed stage 6TH.

The third and fourth clutches C3 and C4 and the second brake B2 are operated at a seventh forward speed stage 7TH.

The second, third and fourth clutches C2, C3, and C4 B1 are operated at an eighth forward speed stage 8TH.

The fourth clutch C4 and the first and second brakes B1 and B2 are operated at a ninth forward speed stage 9TH.

The first, third and fourth clutches C1, C3, and C4 are operated at a tenth forward speed stage 10TH.

The first, second and third clutches C1, C2, and C3 are operated at a reverse speed stage REV.

Shifting processes in the various embodiments of the present invention will be described in further detail.

If the second and third clutches C2 and C3 and the second brake B2 are operated at a first forward speed stage 1ST, the second rotation shaft TM2 is connected to the ninth rotation shaft TM9, the fourth rotation shaft TM4 is connected to the ninth rotation shaft TM9, rotation speed of the input shaft IS is input to the first rotation shaft TM1, and the fifth, fourth and seventh rotation shafts TM5, TM4 and TM7 are operated as the fixed elements. Therefore, the first forward speed stage is achieved.

If the first and second clutches C1 and C2 and the second brake B2 are operated at a second forward speed stage 2ND, the third rotation shaft TM3 is connected to the eighth rotation shaft TM8, the second rotation shaft TM2 is connected to the ninth rotation shaft TM9, rotation speed of the input shaft IS is input to the first rotation shaft TM1, and the fifth and seventh rotation shafts TM5 and TM7 are operated as the fixed elements. Therefore, the second forward speed stage is achieved.

If the second and fourth clutches C2 and C4 and the second brake B2 are operated at a third forward speed stage 3RD, the second rotation shaft TM2 is connected to the ninth rotation shaft TM9, the sixth rotation shaft TM6 is connected to the ninth rotation shaft TM9, rotation speed of the input shaft IS is input to the first rotation shaft TM1, and the fifth and seventh rotation shafts TM5 and TM7 are operated as the fixed elements. Therefore, the third forward speed stage is achieved.

If the first and fourth clutches C1 and C4 and the second brake B2 operated at a fourth forward speed stage 4TH, the third rotation shaft TM3 is connected to the eighth rotation shaft TM8, the sixth rotation shaft TM6 is connected to the ninth rotation shaft TM9, rotation speed of the input shaft IS is input to the first rotation shaft TM1, and the fifth and seventh rotation shafts TM5 and TM7 are operated as the fixed elements. Therefore, the fourth forward speed stage is achieved.

If the first, second and fourth clutches C1, C2, and C4 are operated at a fifth forward speed stage 5TH, the third rotation shaft TM3 is connected to the eighth rotation shaft TM8, the ninth rotation shaft TM9 is connected to the second and sixth rotation shafts TM2 and TM6, rotation speed of the input shaft IS is input to the first rotation shaft TM1, and the fifth rotation shaft TM5 is operated as the fixed element. Therefore, the fifth forward speed stage is achieved.

If the third and fourth clutches C3 and C4 and the first brake B1 are operated at a sixth forward speed stage 6TH, the fourth rotation shaft TM4 is connected to the seventh rotation shaft TM7, the sixth rotation shaft TM6 is connected to the ninth rotation shaft TM9, rotation speed of the input shaft IS is input to the first rotation shaft TM1, and the second and fifth rotation shafts TM2 and TM5 are operated as the fixed element. Therefore, the sixth forward speed stage is achieved.

If the third and fourth clutches C3 and C4 and the second brake B2 are operated at a seventh forward speed stage 7TH, the fourth rotation shaft TM4 is connected to the seventh rotation shaft TM7, the sixth rotation shaft TM6 is connected to the ninth rotation shaft TM9, rotation speed of the input shaft IS is input to the first rotation shaft TM1, and the fifth, fourth and seventh rotation shafts TM5, TM4 and TM7 are operated as the fixed element. Therefore, the seventh forward speed stage is achieved.

If the second, third and fourth clutches C2, C3, and C4 B1 are operated at an eighth forward speed stage 8TH, the second rotation shaft TM2 is connected to the ninth rotation shaft TM9, the fourth rotation shaft TM4 is connected to the seventh rotation shaft TM7, the sixth rotation shaft TM6 is connected to the ninth rotation shaft TM9, rotation speed of the input shaft IS is input to the first rotation shaft TM1, and the fifth rotation shaft TM5 is operated as the fixed element. Therefore, the eighth forward speed stage is achieved.

If the fourth clutch C4 and the first and second brakes B1 and B2 are operated at a ninth forward speed stage 9TH, the sixth rotation shaft TM6 is connected to the ninth rotation shaft TM9, rotation speed of the input shaft IS is input to the first rotation shaft TM1, and the fifth, second and seventh rotation shafts TM5, TM2 and TM7 are operated as the fixed elements. Therefore, the ninth forward speed stage is achieved.

If the first, third and fourth clutches C1, C3, and C4 are operated at a tenth forward speed stage 10TH, the third rotation shaft TM3 is connected to the eighth rotation shaft TM8, the fourth rotation shaft TM4 is connected to the seventh rotation shaft TM7, the sixth rotation shaft TM6 is connected to the ninth rotation shaft TM9, rotation speed of the input shaft IS is input to the first rotation shaft TM1, and the fifth rotation shaft TM5 is operated as the fixed element. Therefore, the tenth forward speed stage is achieved.

If the first, second and third clutches C1, C2, and C3 are operated at a reverse speed stage REV, the third rotation shaft TM3 is connected to the eighth rotation shaft TM8, the second rotation shaft TM2 is connected to the ninth rotation shaft TM9, rotation speed of the input shaft IS is input to the first rotation shaft TM1, and the fifth rotation shaft TM5 is operated the fixed elements. Therefore, the reverse speed stage is achieved.

The planetary gear train according to various embodiments of the present invention may achieve ten forward speed stages and one reverse speed stage by controlling four planetary gear sets PG1, PG2, PG3, and PG4 with four clutches C1, C2, C3, and C4 and two brakes B1 and B2.

Therefore, the planetary gear train according to various embodiments of the present invention may improve power delivery performance and fuel efficiency.

Since a speed stage suitable to engine speed can be achieved due to multiple speed stages, silent driving may be improved.

In addition, since three friction elements operate at each speed stage and the number of non-operating friction elements is minimized, a friction drag loss may be decreased. Therefore, power delivery efficiency and fuel efficiency may be improved.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the claims appended hereto and their equivalents.

What is claimed is:

1. A planetary gear train of an automatic transmission for a vehicle, comprising:
    an input shaft receiving torque of an engine;
    an output shaft outputting changed torque of the engine;
    a first planetary gear set including a first sun gear, a first planet carrier, and a first ring gear;
    a second planetary gear set including a second sun gear, a second planet carrier, and a second ring gear;
    a third planetary gear set including a third sun gear, a third planet carrier, and a third ring gear;
    a fourth planetary gear set including a fourth sun gear, a fourth planet carrier, and a fourth ring gear;
    a first rotation shaft including the first sun gear and the third planet carrier and directly connected to the input shaft;
    a second rotation shaft including the first planet carrier and the third ring gear and selectively connected to a transmission housing;
    a third rotation shaft including the first ring gear and the second planet carrier;
    a fourth rotation shaft including the fourth sun gear;
    a fifth rotation shaft including the second ring gear and directly connected to the transmission housing;
    a sixth rotation shaft including the third sun gear;
    a seventh rotation shaft including the fourth sun gear, selectively connected to the fourth rotation shaft, and selectively connected to the transmission housing;
    an eighth rotation shaft including the fourth planet carrier, selectively connected to the third rotation shaft, and directly connected to the output shaft; and
    a ninth rotation shaft including the fourth ring gear and selectively connected to the second rotation shaft.

2. The planetary gear train of claim 1, wherein each of the first, second, third, and fourth planetary gear sets comprises a single pinion planetary gear set.

3. The planetary gear train of claim 1, wherein the first, second, third, and fourth planetary gear sets are disposed sequentially from an engine side.

4. The planetary gear train of claim 1, further comprising:
    a first clutch disposed between the third rotation shaft and the eighth rotation shaft;
    a second clutch disposed between the second rotation shaft and the ninth rotation shaft;
    a third clutch disposed between the fourth rotation shaft and the seventh rotation shaft;
    a fourth clutch disposed between the sixth rotation shaft and the ninth rotation shaft;
    a first brake disposed between the second rotation shaft and the transmission housing; and
    a second brake disposed between the seventh rotation shaft and the transmission housing.

5. The planetary gear train of claim 4, wherein a first forward speed stage is achieved by operation of the second and third clutches and the second brake,
    a second forward speed stage is achieved by operation of the first and second clutches and the second brake, a third forward speed stage is achieved by operation of the second and fourth clutches and the second brake, a fourth forward speed stage is achieved by operation of the first and fourth clutches and the second brake, a fifth forward speed stage is achieved by operation of the first, second and fourth clutches, a sixth forward speed stage is achieved by operation of the third, fourth clutches and the first brake, a seventh forward speed stage is achieved by operation of the third and fourth clutches and the second brake, an eighth forward speed stage is achieved by operation of the second, third and fourth clutches, a ninth forward speed stage is achieved by operation of the fourth clutch and the first and second brakes, a tenth forward speed stage is achieved by operation of the first, third and fourth clutches, and a reverse speed stage is achieved by operation of the first, second and third clutches.

6. A planetary gear train of an automatic transmission for a vehicle, comprising:

an input shaft receiving torque of an engine;

an output shaft outputting changed torque of the engine;

a first planetary gear set including a first sun gear, a first planet carrier, and first ring gear;

a second planetary gear set including a second sun gear, a second planet carrier, and a second ring gear;

a third planetary gear set including a third sun gear, a third planet carrier, and a third ring gear;

a fourth planetary gear set including a fourth sun gear, a fourth planet carrier, and a fourth ring gear;

a first clutch selectively connecting the second planet carrier to the fourth planet carrier;

a second clutch selectively connecting the third ring gear to the fourth ring gear;

a third clutch selectively connecting the second sun gear to the fourth sun gear;

a fourth clutch selectively connecting the third sun gear to the fourth ring gear;

a first brake selectively connecting the first planet carrier to the transmission housing; and a second brake selectively connecting the fourth sun gear to the transmission housing, wherein the input shaft is directly connected to the first sun gear, the output shaft is directly connected to the fourth planet carrier, the first sun gear is directly connected to third planet carrier, the first planet carrier is directly connected to the third ring gear, the first ring gear is directly connected to the second planet carrier, and the second ring gear is directly connected to the transmission housing.

7. The planetary gear train of claim 6, wherein each of the first, second, third, and fourth planetary gear sets comprises a single pinion planetary gear set.

8. The planetary gear train of claim 6, wherein the first, second, third, and fourth planetary gear sets are disposed sequentially from an engine side.

9. The planetary gear train of claim 6, wherein a first forward speed stage is achieved by operation of the second and third clutches and the second brake, a second forward speed stage is achieved by operation of the first and second clutches and the second brake, a third forward speed stage is achieved by operation of the second and fourth clutches and the second brake, a fourth forward speed stage is achieved by operation of the first and fourth clutches and the second brake, a fifth forward speed stage is achieved by operation of the first, second and fourth clutches, a sixth forward speed stage is achieved by operation of the third, fourth clutches and the first brake, a seventh forward speed stage is achieved by operation of the third and fourth clutches and the second brake, an eighth forward speed stage is achieved by operation of the second, third and fourth clutches, a ninth forward speed stage is achieved by operation of the fourth clutch and the first and second brakes, a tenth forward speed stage is achieved by operation of the first, third and fourth clutches, and a reverse speed stage is achieved by operation of the first, second and third clutches.

* * * * *